UNITED STATES PATENT OFFICE.

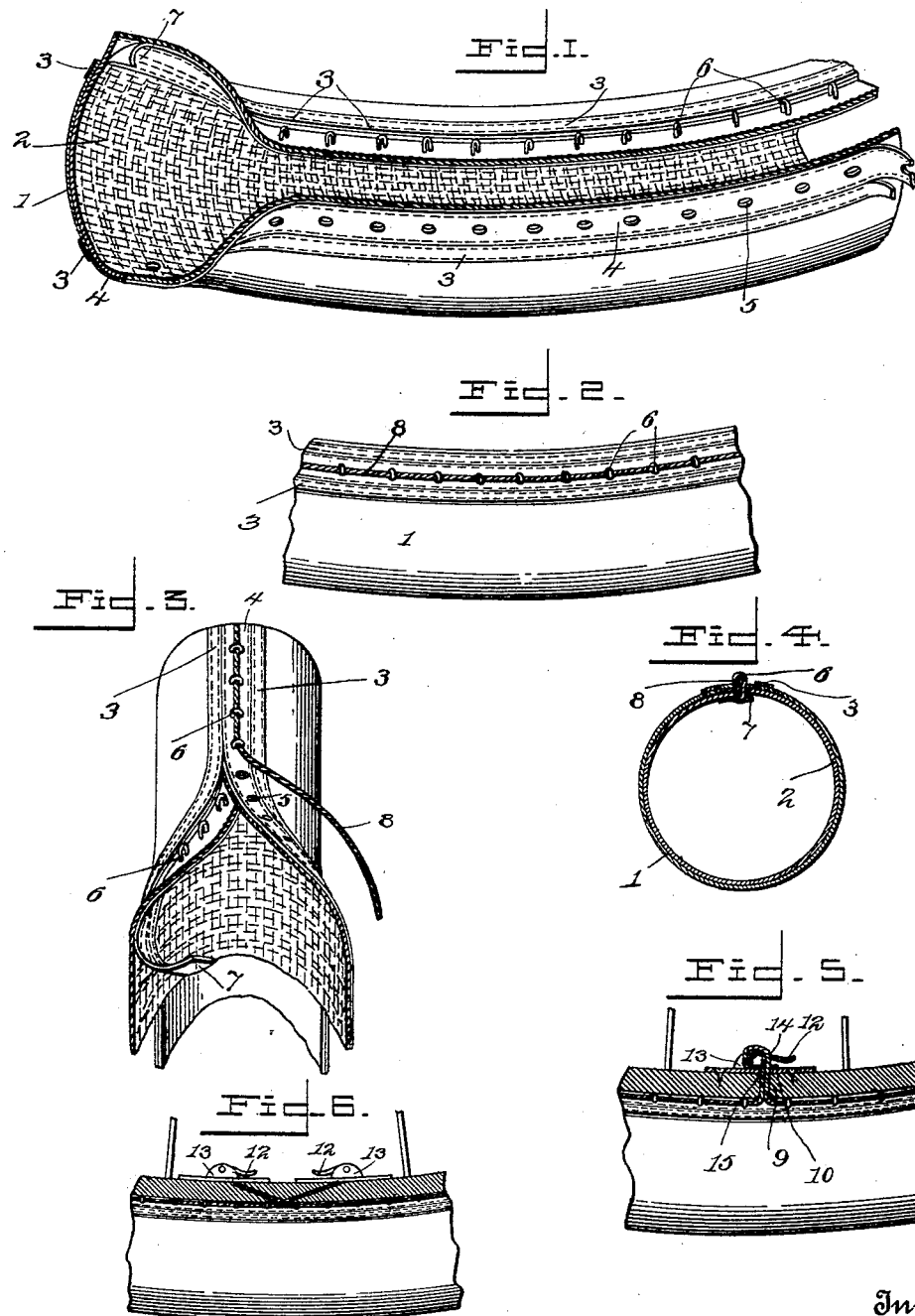

JACOB REEPMAKER, OF ROTTERDAM, NETHERLANDS.

BICYCLE-TIRE.

SPECIFICATION forming part of Letters Patent No. 602,565, dated April 19, 1898.

Application filed November 8, 1897. Serial No. 657,832. (No model.)

*To all whom it may concern:*

Be it known that I, JACOB REEPMAKER, a subject of the Queen of the Netherlands, residing at Rotterdam, Netherlands, have invented certain new and useful Improvements in Bicycle-Tires; and I do declare the following to be a full, clear, and exact description of the invention, such as will enable others skilled in the art to which it appertains to make and use the same.

My invention relates to pneumatic tires for vehicle-wheels, and more particularly to that class in which the inner air tube or tubes are protected by an outer sheath or covering which forms the tread; and the object of the invention is to provide a simple, effective, and durable sheath of this class.

To this end the invention consists in the construction, combination, and arrangement of the device, as will be hereinafter more fully described, and particularly pointed out in the claims.

In the accompanying drawings the same reference characters indicate the same parts of the invention.

Figure 1 is a perspective view of a section of a sheath embodying my invention. Fig. 2 is a similar view showing the sheath laced. Fig. 3 is a similar view, partly in section, of the same, showing some of the parts broken away to more clearly illustrate the construction of those parts lying beneath. Fig. 4 is a transverse section. Fig. 5 shows the manner of securing the ends of the lacing on the tires of vehicles. Fig. 6 shows a method of fastening the ends of the lacing-cords separately.

1 represents the flexible rubber envelop, and 2 the canvas backing, which is first "quilted" by longitudinal and transverse rows of stitching, as shown, to give additional strength and durability to the same without affecting its flexibility.

The rubber is narrower than the canvas, leaving a marginal edge of canvas on each edge of the rubber, and a binding-strip of tape 3 is laid along both edges of the rubber and the same firmly secured to the canvas by parallel rows of stitching, as shown, and the edges of the canvas are further protected by whip-stitching.

One of the marginal edges of the canvas is reinforced by a strip of leather 4, and a series of eyelets 5 5 are worked through the leather and canvas. The opposite marginal edge of the canvas is provided with a corresponding series of flexible loops 6 6, and the inner face of this marginal part is also reinforced by a leather strip 7, which also serves to protect the inner ends of the loops 6 6.

In applying the sheath to a wheel the inner air-tube is deflated and the sheath made to encompass it. The marginal edges of the canvas are then brought together, so as to overlap, and the loops 6 6 inserted through the alined eyelets in the overlapping edge. A lacing-cord 8 is now inserted through the loops and the ends brought together and tied in a knot, which is arranged to lie between the laced face of the sheath and the contiguous face of the grooved rim. The inner tube is now inflated, causing the sheath to snugly encompass and hug the rim.

The above description applies to double-tube tires, while for single-tube tires the sheath may be formed as above, with the exception that the rubber envelop may be dispensed with.

In its application to the tires of autocars, carriages, and other heavy vehicles the material, of course, will be proportionately heavier, and as the larger cord required would make a cumbersome knot I pass the meeting ends of the rope inwardly through an orifice 9 in the rim and then under the shorter arm 10 of a clamping-lever 12, fulcrumed in the bracket 13, fixed to the inner face of the rim. This clamping-lever is also of novel construction, its longer arm 12 being provided with an orifice 14, which is alined with an orifice 15 in the bracket and which corresponds to the orifice 9 in the rim.

The rope or cord is first passed through the orifices 9 and 15 and then through the orifice 14 in the lever and the free ends then passed around and under the shorter arm, so that when the lever 12 is pressed down the end of the cord or rope will be clamped between the end of the shorter arm and the contiguous face of the bracket, and the strain imparted to the cord when the tire is in use tends to draw the longer arm down, and thus effectually clamp the cord in place.

In Fig. 6 I have shown two bracket-clamps for independently securing the ends of the lacing-cord, so that one end may be secured first and the second drawn taut and then secured as in the first instance.

While I have described my invention and illustrated the same in the best form now known to me, changes in the details may be made within the skill of a mechanic practiced in the art without departing from the spirit of my invention as set forth in the claims, forming a part of this specification.

Having thus fully described my invention, what I claim as new, and desire to secure by Letters Patent of the United States, is—

1. A sheath for pneumatic tires comprising an outer rubber envelop, an inner quilted or reinforced canvas of greater width than the envelop and stitched thereto to form overlapping flaps which project on each side of the envelop and have their edges reinforced by whip-stitches, the reinforcing-strip 4 stitched to the outer of one of the flaps and having one of its edges abutting against one edge of the rubber envelop, the reinforcing-strip 7 secured to the under side of the other overlapping flap, a longitudinal row of eyelets formed through the reinforcing-strip 4 and the overlapping flap to which it is attached, a series of loops secured to the opposite overlapping flap, said loops projecting through said eyelets, and a lacing-cord passed through the ends of the loops to secure them in said eyelets, substantially as set forth.

2. The combination with the rim of a wheel and the sheath of a pneumatic tire, and the lacing-cord for said sheath, said rim having orifices, of the bracket 13 having an orifice, the lever 12 fulcrumed on said bracket and provided with an orifice, and a short arm 10 adapted to clamp said lacing-cord in said bracket, the orifices in the bracket and the rim of the wheel registering, while the orifice in the lever is at one side of the registering-orifices, substantially as set forth.

In testimony whereof I hereunto affix my signature in presence of two witnesses.

JACOB REEPMAKER.

Witnesses:
IVAN ROSSEMER,
H. H. BOERMA.